March 9, 1954 H. L. MILLER Re. 23,797

VARIABLE VOLTAGE SUPPLY SYSTEM

Original Filed July 6, 1951 2 Sheets-Sheet 1

Inventor:
Howard L. Miller
by his Attorneys
Howson & Howson

VARIABLE VOLTAGE SUPPLY SYSTEM

Original Filed July 6, 1951 2 Sheets-Sheet 2

Inventor:
Howard L. Miller
by his Attorneys
Howson & Howson

Reissued Mar. 9, 1954

Re. 23,797

UNITED STATES PATENT OFFICE 23,797

VARIABLE VOLTAGE SUPPLY SYSTEM

Howard L. Miller, Lansdale, Pa.

Original No. 2,645,725, dated July 14, 1953, Serial No. 235,520, July 6, 1951. Application for reissue October 20, 1953, Serial No. 387,340

6 Claims. (Cl. 307—17)

Matter enclosed in heavy brackets [ ] appears in the original patent but forms no part of this reissue specification; matter printed in italics indicates the additions made by reissue.

This invention relates to electric current supply apparatus, and more particularly to apparatus for supplying and distributing electric current from supply conductors to various load circuits.

In many instances where electric current is supplied from common mains to a substantial number of load circuits, there is considerable voltage drop in the load circuits before reaching the actual load, and consequently the load is supplied with less voltage than that intended. For example, in the case of a large building, such as a large office or industrial building, the lighting circuits may run from a distribution panel box at a remote location, and consequently some of the circuits may be of such physical length that considerable voltage drop may take place due to the resistance of the wire between the distribution panel box and the lighting devices being supplied. This is particularly objectionable in the case of fluorescent lighting devices, now widely used, which may not operate satisfactorily if the voltage drops appreciably below the rated voltage of such devices.

The principal object of the present invention is to overcome the above-mentioned objection by enabling increase of voltage to compensate for voltage drop in a load circuit.

Another object of the invention is to provide a novel arrangement whereby the voltage supplied to any one of various load circuits may be easily adjusted to compensate for voltage drop in the circuit.

A further object of the invention is to provide a novel current distribution apparatus wherein the voltage supplied from common mains to various load circuits may be adjusted at the input end of each circuit to compensate for voltage drop therein.

A still further object of the invention is to provide a novel combination for compensation of line voltage fluctuations.

Other objects and features of the invention will be apparent from the following detailed description, with reference to the accompanying drawings wherein.

Figure 1:
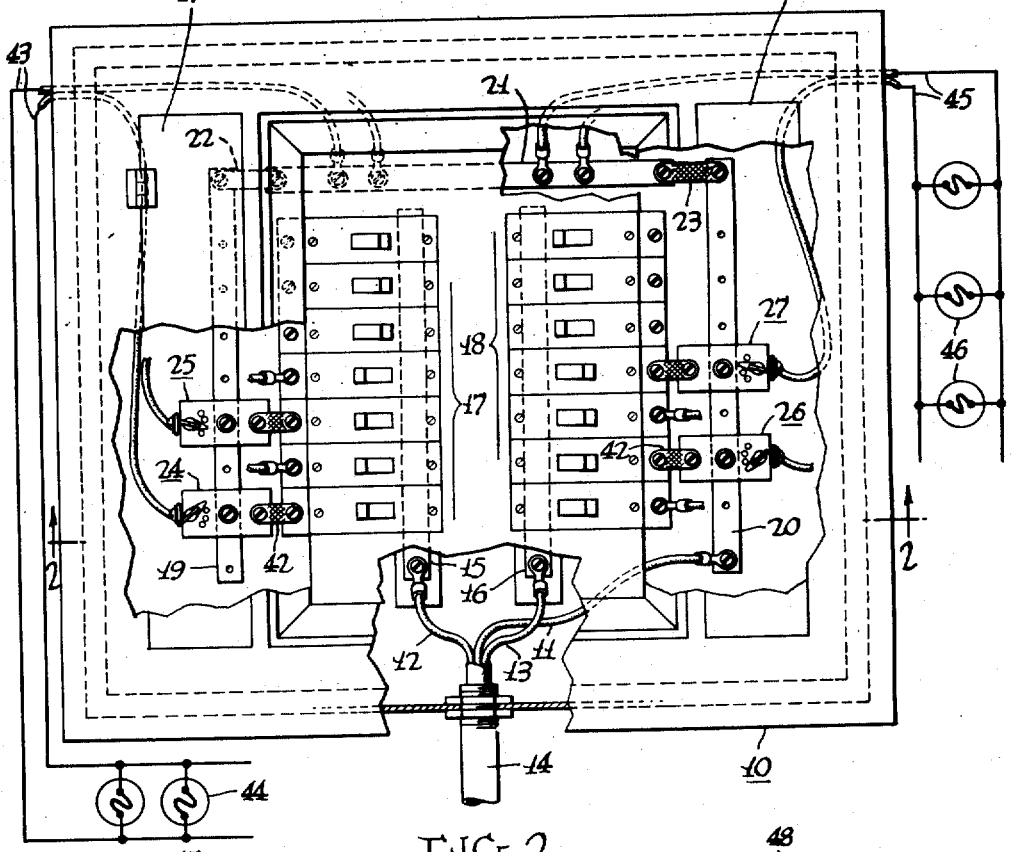
Fig. 1 is a front elevational view of a distribution panel box embodying the present invention, with a portion of the casing or housing broken away for the purpose of illustration.
Figure 2:
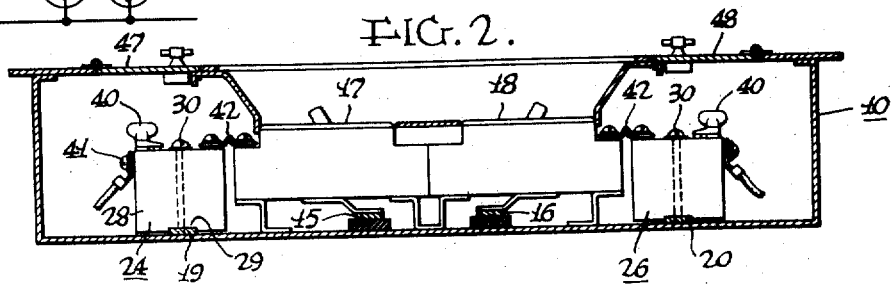
Fig. 2 is a sectional view taken along line 2—2 of Fig. 1.

Referring first to Figs. 1 and 2, there is shown a distribution panel box 10 for the supply of load circuits from a 115–230 volt three-wire supply line, one of whose conductors is a neutral or ground conductor. The ground conductor is shown at 11, while the other two conductors are shown at 12 and 13, all three conductors entering the panel box through a pipe or conduit 14. As is conventional in boxes of this type, the two conductors 12 and 13 are connected to bus bars 15 and 16 from which various load circuits extend through the two rows of switch units 17 and 18. The physical mounting of the bus bars and switch units is conventional and need not be described.

In the box shown there are provided outwardly located bus bars 19, 20 and 21 which are interconnected by links 22 and 23. The bars 19, 20 and 21 may be at ground potential and, therefore may be mounted directly on the box. The neutral or ground conductor 11 is shown connected to bar 20 and, of course, it is electrically connected to bars 19 and 21 through the electrical interconnection of the three bars. Each load circuit to be supplied is connected to one of the switch units and to one of the neutral or ground bus bars, it being assumed that such circuit is to be supplied with 115 volts.

Figure 3:
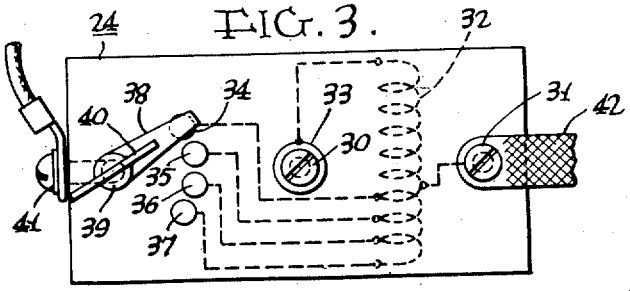
Fig. 3 is a plan view of an autotransformer provided according to the present invention, showing the internal electrical connections.

To overcome the aforementioned objection, a transformer—preferably an adjustable autotransformer—is provided for each load circuit whose voltage it may be desired to increase in order to compensate for voltage drop. In the illustration of Fig. 1, four autotransformers are shown at 24, 25, 26 and 27 in association with four of the switch units. As may be seen in Fig. 2, each autotransformer comprises a metallic casing 28 having a bottom recess 29 to seat snugly on one of the neutral or ground bars 19 and 20, and a screw 30 extends centrally through the autotransformer casing and threadedly engages the associated bar to secure the autotransformer thereto. As shown in Fig. 3, the input terminal 31 of each autotransformer is connected to an intermediate point on the winding 32 of the autotransformer. One end of the winding 32 is connected to the ground or neutral bar 19 or 20, for example, by being connected to a washer 33 held by the screw 30. A number of points along the winding 32 are connected to fixed contacts 34 to 37 which are selectably engageable by a manually rotatable contact arm 38 pivotally mounted at 39, said arm being provided with a finger grip 40 to enable rotation. To prevent arcing, the contact end of arm 38 is sufficiently wide so that it will engage one contact before it leaves another. The contact arm is connected to the output terminal 41.

It may be assumed that the contact 34 is connected to a point on the winding 32 giving a voltage of 115 volts, and that the contacts 35, 36 and 37 are connected to points giving voltages of 120, 125 and 130. Thus, by moving the contact arm 38 from contact 34 to one of the other contacts, the output voltage of the autotransformer is raised accordingly.

Each autotransformer has its input terminal connected to the associated switch unit through a connecting link 42. The load circuit to be supplied is connected to the output terminal of the autotransformer and to one of the ground or neutral bars. Thus, in Fig. 1, a load circuit, represented at 43 and supplying lamps 44, has one of its conductors connected to the output terminal of autotransformer 24 while its other conductor is connected to the bar 21. In like manner, another load circuit 45, supplying lamps 46, has one of its conductors connected to the output terminal of autotransformer 27, and has its other conductor connected to the bar 21.

In order to give access to the autotransformers to enable adjustment thereof, doors 47 and 48 are provided on the panel box.

Figure 4:
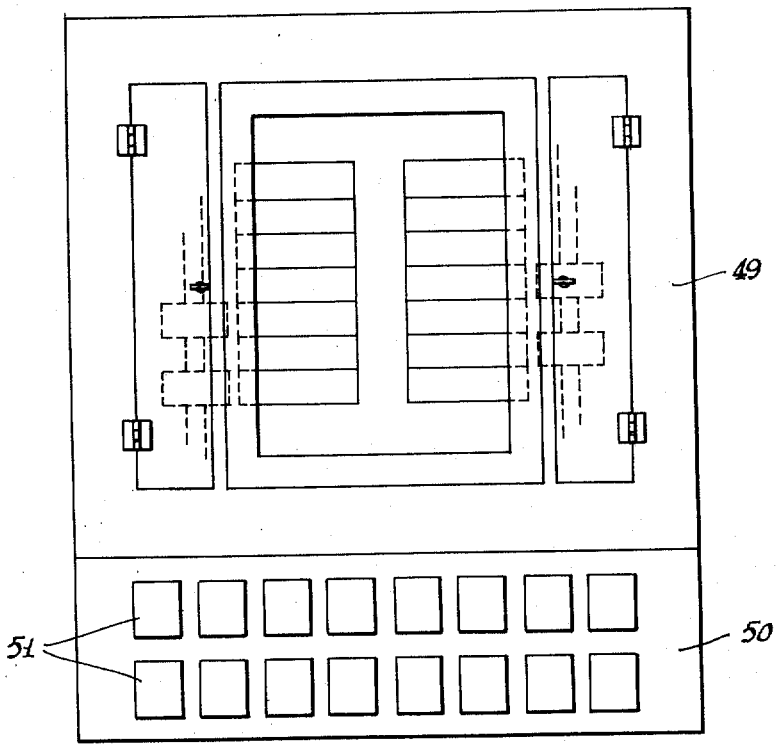
Fig. 4 is a front elevational view of a distribution panel box incorporating a further feature of the invention.
Figure 5:
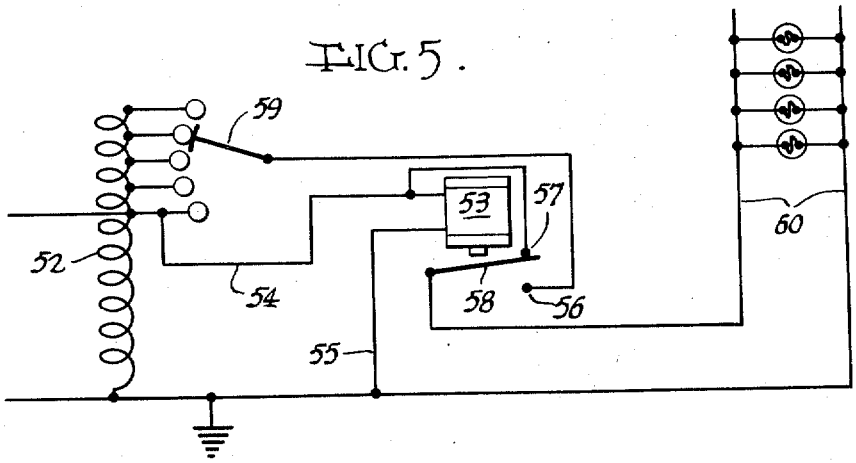
Fig. 5 is a diagrammatic illustration of one of the electrical circuits employed in the apparatus of Fig. 4.

Figs. 4 and 5 show an arrangement for automatic compensation of line voltage drop. In Fig. 4 the distribution panel box 49 is identical with that shown in Fig. 1, but has added thereto a relay panel 50 containing relays 51, there being a relay for each load circuit whose voltage it is desired to control. The electrical interconnection between each relay and the associated autotransformer is shown in Fig. 5. The autotransformer represented at 52 is similar to that shown in Fig. 3. However, in this instance a voltage-responsive relay 53 is connected to receive the input voltage through connections 54 and 55. The relay has stationary contacts 56 and 57 and a movable contact arm or armature 58. Contact 56 is connected to the movable contact arm 59 of the autotransformer, while contact 57 is connected to the ungrounded side of the load circuit 60 to be supplied.

It may be assumed that the contact arm 59 of the autotransformer is set on one of the contacts to give a higher voltage than the input voltage. As long as the input voltage is at its rated value however, the relay is energized, as shown, and the load circuit 60 is connected directly across the input circuit. However, if the input voltage decreases to a predetermined extent, the relay 53 is deenergized, thus connecting the load circuit 60 to the contact arm 59 of the autotransformer, which raises the voltage applied to the load circuit.

Relays of the type here contemplated are common and are designed to hold in at a certain voltage and to drop out at a predetermined lower voltage. The adjustable transformer may be set according to the voltage differential of the relay. For example, if the transformer is adjustable in five volt steps, and if the relay employed has a differential of ten volts, then the transformer may be set to give a ten volt increase whenever the relay drops out, or the transformer may be set to give a greater increase to compensate for line drop.

The transformer and relay combination may be used in any instance where it is desired to compensate for variation of a supply voltage. The combination may be provided as a unit for controlling voltage, or the transformer and the relay may be provided as individual units which may be electrically connected in the manner shown in Fig. 5.

While certain embodiments of the invention have been illustrated and described, it is to be understood that the invention is not limited thereto but is capable of various modifications and other embodiments such as will occur to persons skilled in the art. The invention may be adapted to any conventional distribution in the 250 volt and 600 volt class, single phase or poly-phase, grounded or ungrounded systems, employing either an autotransformer or a conventional two winding transformer.

I claim:

1. In a current-distribution device, a metal container box, a current-supply bus bar mounted within said box and insulated therefrom, a plurality of current-distribution units mounted within said box and electrically connected to said bus bar for supplying current to a number of individual load circuits including load devices, a common current-return bus bar for said load circuits mounted directly on said box, and an individual adjustable voltage-boosting transformer unit, for each individual load circuit in which there is substantial voltage drop, physically and electrically associated with said current-return bus bar and with the current-distribution unit supplying the individual load circuit, whereby the voltage at each load device may be substantially equalized with respect to the voltage at each other load device regardless of the distance of each load device from the current-distribution device.

2. A current-distribution device according to claim 1, wherein said current-distribution units are arranged in a row, and said current-return bus bar is disposed in spaced parallel relation to said row of units, and each of said adjustable transformer units is mounted on said current-return bus bar in physical alignment with the associated current-distribution unit.

3. A current-distribution device according to claim 2, wherein said current-return bus bar has spaced threaded apertures aligned respectively with said current-distribution units, and each transformer unit has a mounting and connecting screw passing therethrough and engaging one of said apertures.

4. A current-distribution device according to claim 1, further including means electrically associated with each transformer unit to effect voltage boosting in response to decrease of the supply voltage.

*5. In a current-distribution device for supplying a number of individual load circuits from a common supply voltage, a metal container box, a current-supply bus bar mounted within said box and insulated therefrom, a plurality of current-distribution units mounted within said box and electrically connected to said bus bar for supplying current to a number of individual load circuits including load devices, a common current-return bus bar for said load circuits mounted directly on said box, and an individual voltage-changing transformer unit, for each individual load circuit to be supplied with a voltage of different value than the supply voltage, physically*

*and electrically associated with said curren-return bus bar and with the current-distribution unit supplying the individual load circuit, whereby the voltage at each load device is caused to be of the proper value for the particular load device.*

*6. In an electrical distribution device for supplying a number of individual load circuits from a common supply voltage, a metal container box, a plurality of supply connections within said box for supplying current from the common voltage supply to a number of individual load circuits including load devices, a common current-return bus for said load load circuits mounted in said box, and an individual voltage-changing transformer unit, for each individual load circuit to be supplied with a voltage of different value than the supply voltage, physically and electrically associated with said current-return bus and with*

*the current-supply connection supplying the individual load circuit, whereby the voltage at each load device is caused to be of the proper value for the particular load device.*

HOWARD L. MILLER.

References Cited in the file of this patent or the original patent

UNITED STATES PATENTS

| Number | Name | Date |
|---|---|---|
| 399,219 | Stillwell | May 15, 1889 |
| 698,156 | Thompson | Apr. 22, 1902 |
| 858,676 | Slaughter | July 2, 1907 |
| 1,047,086 | Krantz | Dec. 10, 1912 |
| 1,224,409 | Phelps | May 1, 1917 |
| 1,744,209 | Burnett | Jan. 21. 1930 |
| 1,909,053 | George | May 16, 1933 |